(12) United States Patent
Kyle, II

(10) Patent No.: US 9,348,367 B1
(45) Date of Patent: May 24, 2016

(54) TABLET COMPUTER HANDLE

(71) Applicant: James Kyle, II, Yorba Linda, CA (US)

(72) Inventor: James Kyle, II, Yorba Linda, CA (US)

( * ) Notice: Subject to any disclaimer, the term of this patent is extended or adjusted under 35 U.S.C. 154(b) by 0 days.

(21) Appl. No.: 14/606,475

(22) Filed: Jan. 27, 2015

(51) Int. Cl.
*G06F 1/16* (2006.01)
*H04W 4/00* (2009.01)

(52) U.S. Cl.
CPC ............. *G06F 1/1628* (2013.01); *H04W 4/008* (2013.01)

(58) Field of Classification Search
CPC .............................. G06F 1/1628; H04W 4/008
See application file for complete search history.

(56) References Cited

U.S. PATENT DOCUMENTS

| | | | |
|---|---|---|---|
| 6,999,797 B2 | 2/2006 | Crawford | |
| D633,095 S | 2/2011 | Cullen | |
| D673,573 S * | 1/2013 | Skene | D14/447 |
| 8,915,660 B1 * | 12/2014 | Ben Yehuda | F16M 11/041 396/420 |
| 2004/0111320 A1 * | 6/2004 | Schlieffers | A47F 9/047 705/16 |
| 2008/0031606 A1 * | 2/2008 | Zax | G03B 29/00 396/56 |
| 2011/0297711 A1 * | 12/2011 | Yu | A45F 5/00 224/272 |
| 2012/0019016 A1 | 1/2012 | Brisbin | |
| 2012/0075799 A1 * | 3/2012 | Pollex | F16M 11/041 361/679.56 |
| 2012/0091312 A1 | 4/2012 | Baker | |
| 2012/0175474 A1 * | 7/2012 | Barnard | F16M 11/041 248/122.1 |
| 2012/0206867 A1 * | 8/2012 | Pence | F16M 11/041 361/679.01 |
| 2012/0327593 A1 | 12/2012 | Finnegan | |
| 2013/0043290 A1 * | 2/2013 | Prater | B60R 11/0235 224/567 |
| 2013/0113229 A1 * | 5/2013 | Wu | A45F 5/10 294/138 |
| 2014/0117061 A1 * | 5/2014 | Hadi | A47B 23/02 224/282 |
| 2014/0124553 A1 * | 5/2014 | Cruz | B62B 9/26 224/409 |
| 2014/0246551 A1 * | 9/2014 | Springer | F16M 11/041 248/276.1 |
| 2014/0262933 A1 * | 9/2014 | Lockwood | A45C 11/00 206/762 |
| 2014/0291469 A1 * | 10/2014 | Zito | F16M 11/046 248/452 |
| 2014/0347000 A1 * | 11/2014 | Hamann | G06F 1/189 320/103 |
| 2014/0347814 A1 * | 11/2014 | Zaloom | G06F 1/1626 361/679.56 |
| 2015/0041244 A1 * | 2/2015 | Kam | A45C 11/00 181/191 |
| 2015/0108317 A1 * | 4/2015 | Cruz | B62B 9/26 248/479 |
| 2015/0196140 A1 * | 7/2015 | Lin | F16M 13/02 248/551 |
| 2015/0220114 A1 * | 8/2015 | Reznik | G06F 1/1633 361/679.55 |

FOREIGN PATENT DOCUMENTS

WO    WO2012050980    6/2012

* cited by examiner

*Primary Examiner* — Lewis West
(74) *Attorney, Agent, or Firm* — Kyle A. Fletcher, Esq.

(57) ABSTRACT

The tablet computer handle includes a handle from which an expandable frame extends. The expandable frame is further defined with a left armature that telescopes with respect to a right armature. The left armature and the right armature are adapted to support a tablet computer therein. The handle is manually grasped in order to adaptively support the tablet computer. The handle includes at least one button that when depressed communicates a function with the tablet computer via a transmitter integrated in the handle.

11 Claims, 4 Drawing Sheets

TABLET COMPUTER HANDLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tablet computers, more specifically, a handle and support that is configured to hold a tablet computer.

SUMMARY OF INVENTION

The tablet computer handle is further defined with a handle from which an expandable frame extends. The expandable frame is further defined with a left armature that telescopes with respect to a right armature. The left armature and the right armature are adapted to support a tablet computer therein. The handle is manually grasped in order to adaptively support the tablet computer. The handle includes at least one button that when depressed communicates a function with the tablet computer via a transmitter integrated in the handle.

These together with additional objects, features and advantages of the tablet computer handle will be readily apparent to those of ordinary skill in the art upon reading the following detailed description of the presently preferred, but nonetheless illustrative, embodiments when taken in conjunction with the accompanying drawings.

In this respect, before explaining the current embodiments of the tablet computer handle in detail, it is to be understood that the tablet computer handle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tablet computer handle.

It is therefore important that the claims be regarded as including such equivalent construction insofar as they do not depart from the spirit and scope of the tablet computer handle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
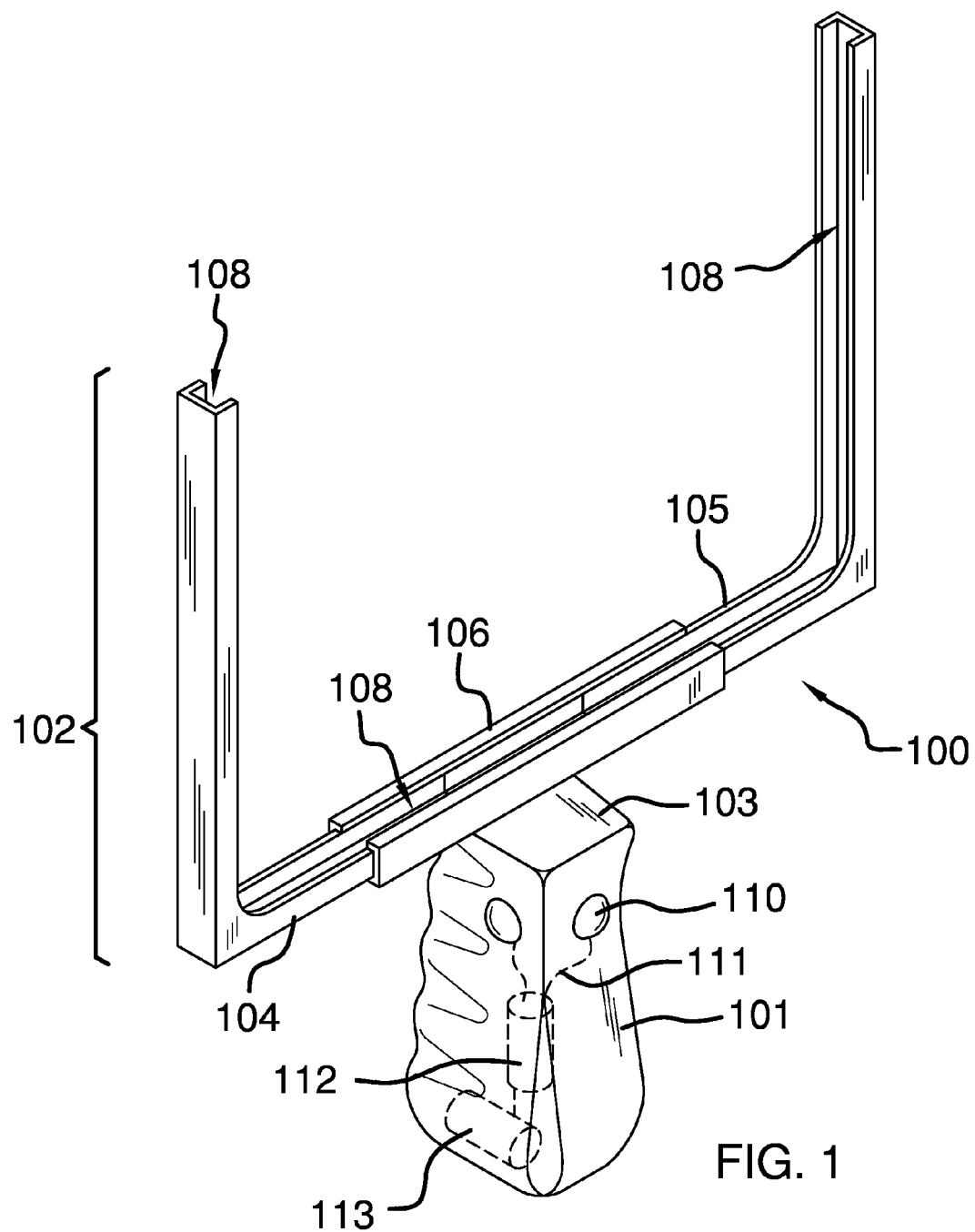
FIG. 1 is a perspective view of an embodiment of the disclosure.
Figure 2:
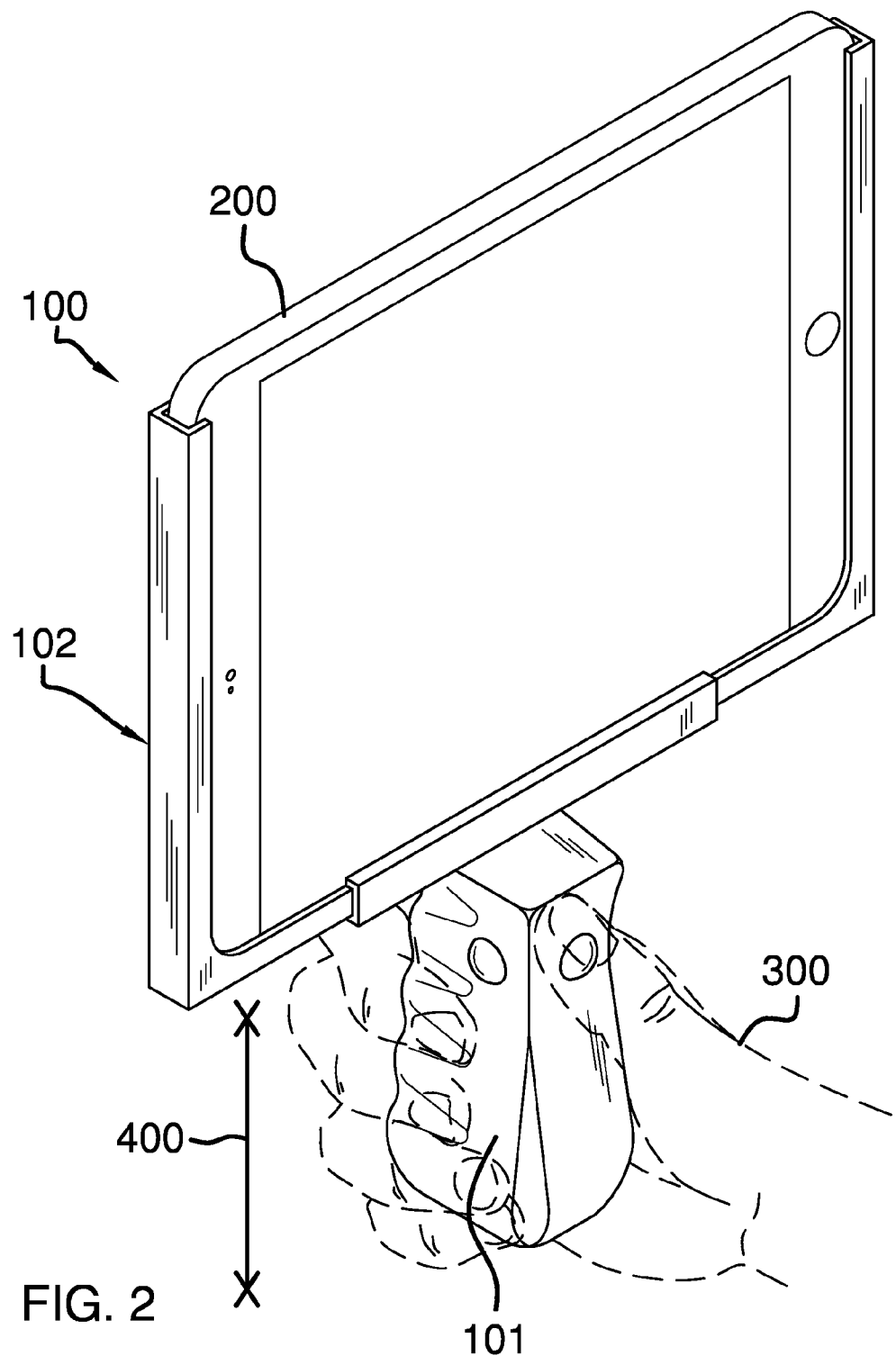
FIG. 2 is a perspective view of an embodiment of the disclosure in use.
Figure 3:
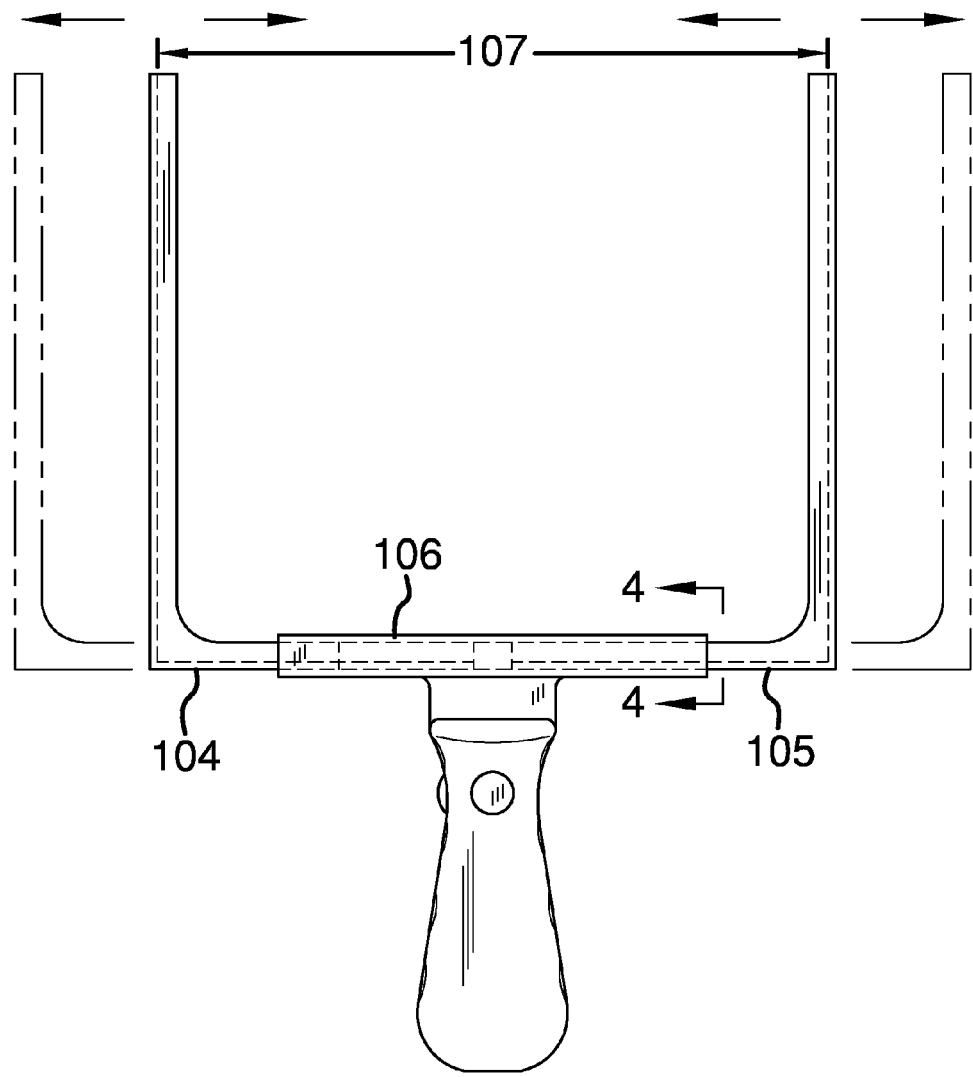
FIG. 3 is a front view of an embodiment of the disclosure.
Figure 4:
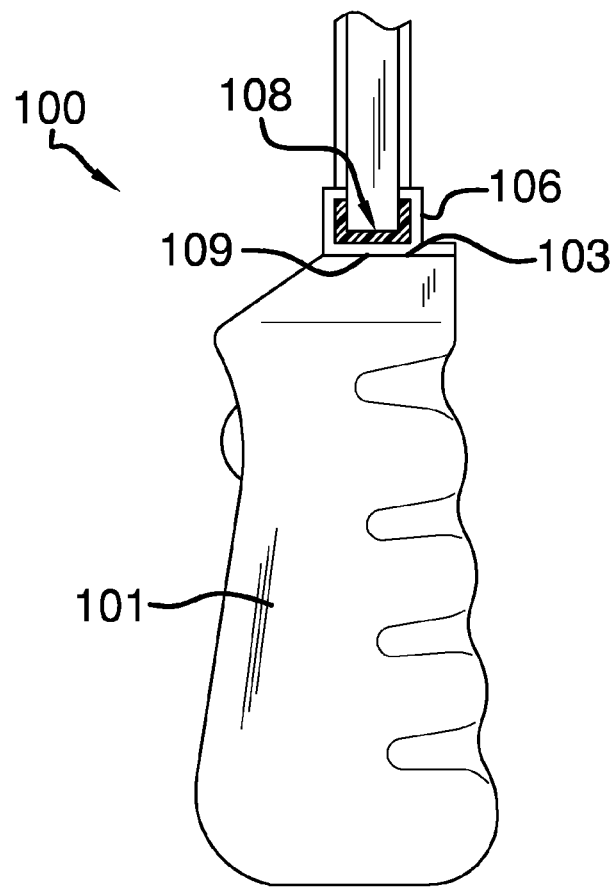
FIG. 4 is a cross-sectional view of an embodiment of the disclosure along line 4-4 in FIG. 3.
Figure 5:
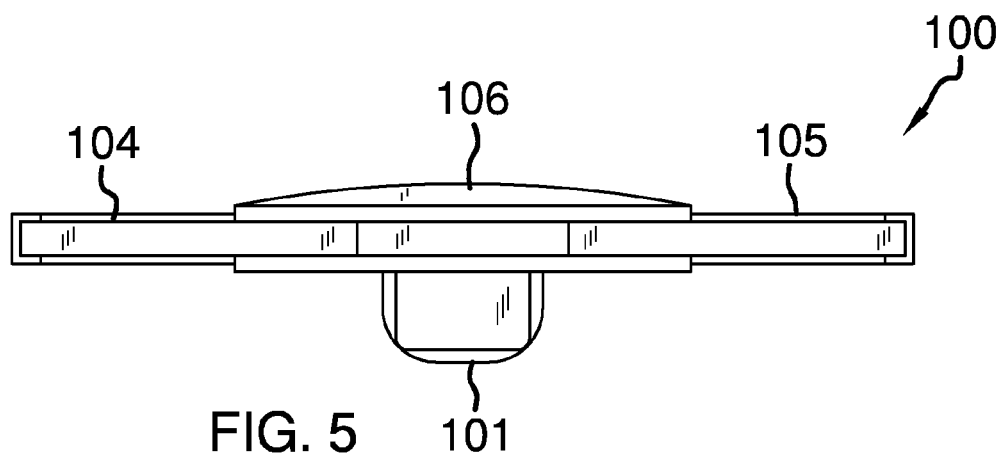
FIG. 5 is a top view of an embodiment of the disclosure.

Detailed reference will now be made to a first potential embodiment of the disclosure, which is illustrated in FIGS. 1 through 5. The tablet computer handle 100 (hereinafter invention) comprises a handle 101 that includes an extendable frame 102 affixed thereon. The handle 101 is further defined with a top handle surface 103 from which the extendable frame 102 is seated.

The extendable frame 102 is further defined with a left armature 104, a right armature 105, and a central frame member 106. The central frame member 106 is further defined with a bottom central surface 109 that is affixed to the top handle surface 103. The left armature 104 as well as the right armature 105 telescopes with respect to the central frame member 106 in order to adjust a frame width 107. The left armature 104, the right armature 105, and the central frame member 106 all have a "C" channel 108 integrated therein. The "C" channel is adapted to support a tablet computer 200 therein.

The handle 101 is adapted to be manually grabbed via a user 300. The handle 101 may include at least one button 110 thereon. The at least one button 110 is connected via a button wire 111 to a wireless transmitter 112 located within the handle 101. The wireless transmitter 112 is wired to a powering member 113 also located in the handle 101. The powering member 113 includes at least one battery that is used to power the wireless transmitter 112. The wireless transmitter 112 may involve a Bluetooth transmitter or other wireless communicating member that is adapted to communicate with the tablet computer 200 in a wireless capacity. The at least one button 110, when depressed, communicates with the tablet computer 200 in order to perform a function, such as taking a photo as most tablet computers include a camera thereon.

It is envisioned that the invention 100 is adapted to hold the tablet computer 200 whilst said tablet computer 200 is playing an audio video file or taking a picture or recording a video via the camera. The invention 100 aids in holding the tablet computer 200 without shaking attributed with the user 300. The handle 101 is vertically oriented with respect to a vertical axis 400, which makes holding the invention 100 involve less strain to the user 300 thereby reducing or eliminating shaking of the tablet computer 200.

With respect to the above description, it is to be realized that the optimum dimensional relationship for the various components of the invention 100 described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention 100.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tablet computer handle comprising:
a handle from which an extendable frame is affixed;
said handle is adapted to be manually grasped via a user;
wherein said extendable frame is adapted to support a tablet computer thereon such that said user is able to hold the tablet computer via the handle;
wherein the handle is further defined with a top handle surface from which the extendable frame is seated;
wherein the extendable frame is further defined with a left armature, a right armature, and a central frame member;
wherein the central frame member is further defined with a bottom central surface that is affixed to the top handle surface of the handle;
wherein the left armature as well as the right armature telescopes with respect to the central frame member in order to adjust a frame width;
wherein the left armature, the right armature, and the central frame member all have a "C" channel integrated therein; wherein the "C" channel is adapted to support said tablet computer therein.

2. The tablet computer handle according to claim 1 wherein the handle is adapted to be manually grabbed via said user; wherein the handle includes at least one button thereon.

3. The tablet computer handle according to claim 2 wherein the at least one button is connected via a button wire to a wireless transmitter located within the handle.

4. The tablet computer handle according to claim 3 wherein the wireless transmitter is wired to a powering member also located in the handle; wherein the powering member includes at least one battery that is used to power the wireless transmitter.

5. The tablet computer handle according to claim 4 wherein the wireless transmitter includes a Bluetooth transmitter or other wireless communicating member that is adapted to communicate with the tablet computer in a wireless capacity; wherein the at least one button, when depressed, communicates with the tablet computer in order to perform a function attributed with the tablet computer.

6. The tablet computer handle according to claim 2 wherein the tablet computer handle aids in holding the tablet computer without shaking attributed with the user.

7. The tablet computer handle according to claim 6 wherein the handle is vertically oriented with respect to a vertical axis, which makes holding the tablet computer handle with less strain to the user thereby reducing or eliminating shaking of the tablet computer.

8. A tablet computer handle comprising:
a handle from which an extendable frame is affixed;
said handle is adapted to be manually grasped via a user;
wherein said extendable frame is adapted to support a tablet computer thereon such that said user is able to hold the tablet computer via the handle;
wherein the handle is further defined with a top handle surface from which the extendable frame is seated;
wherein the extendable frame is further defined with a left armature, a right armature, and a central frame member;
wherein the central frame member is further defined with a bottom central surface that is affixed to the top handle surface of the handle;
wherein the left armature as well as the right armature telescopes with respect to the central frame member in order to adjust a frame width; wherein the left armature, the right armature, and the central frame member all have a "C" channel integrated therein;
wherein the "C" channel is adapted to support said tablet computer therein;
wherein the handle is adapted to be manually grabbed via said user; wherein the handle includes at least one button thereon;
wherein the at least one button is connected via a button wire to a wireless transmitter located within the handle.

9. The tablet computer handle according to claim 8 wherein the wireless transmitter is wired to a powering member also located in the handle; wherein the powering member includes at least one battery that is used to power the wireless transmitter.

10. The tablet computer handle according to claim 9 wherein the wireless transmitter includes a Bluetooth transmitter or other wireless communicating member that is adapted to communicate with the tablet computer in a wireless capacity; wherein the at least one button, when depressed, communicates with the tablet computer in order to perform a function attributed with the tablet computer.

11. The tablet computer handle according to claim 10 wherein the tablet computer handle aids in holding the tablet computer without shaking attributed with the user; wherein the handle is vertically oriented with respect to a vertical axis, which makes holding the tablet computer handle with less strain to the user thereby reducing or eliminating shaking of the tablet computer.

* * * * *